United States Patent [19]

Sanctuary et al.

[11] 3,754,815

[45] Aug. 28, 1973

[54] ROTATABLE MIRROR ANGULAR POSITION ELECTRONIC MEASURING SYSTEM FOR ACTIVATING A DIGITAL DISPLAY

[75] Inventors: Clifford Santuary, Palos Verdes Estates; Donald C. Woods, Big Bear City, both of Calif.

[73] Assignee: Del Mar Engineering Laboratories, Los Angeles, Calif.

[22] Filed: Mar. 17, 1972

[21] Appl. No.: 235,540

[52] U.S. Cl............ 350/285, 250/230, 250/231 SE, 356/152, 178/7.89
[51] Int. Cl............................ G02f 1/34, G01c 1/00
[58] Field of Search...................... 350/285; 356/152; 250/230, 231 SE; 178/7.8, 7.89

[56] References Cited
UNITED STATES PATENTS

| | | | |
|---|---|---|---|
| 3,700,903 | 10/1972 | Adler et al. | 178/7.8 X |
| 2,246,884 | 6/1941 | Johnson | 250/230 X |
| 2,724,310 | 11/1955 | Paine | 350/285 X |
| 3,614,240 | 10/1971 | Brandts | 356/152 |
| 3,642,344 | 2/1972 | Corker | 350/285 X |
| 3,058,342 | 10/1962 | Buck | 350/285 X |
| 3,690,770 | 9/1972 | Raith | 250/230 X |
| 3,614,233 | 10/1971 | Aslund | 350/285 X |
| 3,302,521 | 2/1967 | Grantham et al. | 350/285 X |

Primary Examiner—Ronald L. Wibert
Assistant Examiner—Paul K. Godwin
Attorney—Keith D. Beecher et al.

[57] ABSTRACT

An electronic measuring system is provided which measures the angular position of a rotatable mirror so as to provide an electrical output signal suitable for activating a digital display, or for introduction into a computer for further processing. The mirror, for example, may be incorporated into a galvanometer, gas analyzer, or other measuring instrument. In the practice of the invention, a moving light spot is directed to the mirror for reflection thereby to a photo-detector assembly. The reflected light spot reaches the photo-detector after a time interval which is dependent upon the angular position of the mirror, so that an electrical output signal representative of the angular position of the mirror may be obtained.

5 Claims, 3 Drawing Figures

ROTATABLE MIRROR ANGULAR POSITION ELECTRONIC MEASURING SYSTEM FOR ACTIVATING A DIGITAL DISPLAY

BACKGROUND OF THE INVENTION

Measuring devices using a rotatable mirror are known to the art in which the angular position of the mirror provides the desired measurements. Mirror galvanometers, gas analyzers, and the like, are examples of such devices. For example, oxygen analyzers are known which utilize the paramagnetic property of oxygen to determine the oxygen content in a sample gas, and in which the angular position of a rotatable mirror is an indication of the oxygen content.

Merely by way of example, and without any intention to limit the invention to such a device, the measuring system of the invention will be described herein in conjunction with such an analyzer. However, it will become evident as the description proceeds that the system of the invention may be used in conjunction with a rotatable mirror in a wide variety of devices. For example, the mirror may be incorporated into a mirror galvanometer, an instrument which has been known for many years to detect and measure small electrical currents.

It is usual in the prior art measuring instruments which incorporate a rotatable mirror to include additional stationary mirrors and translucent scales to provide an indication of the angular position of the rotatable mirror. In one such type of prior art instrument, a light beam from an appropriate light source is directed onto the rotatable mirror, and the reflected light beam is further reflected by two stationary mirrors onto a graduated translucent scale which provides a direct reading.

In another such type of prior art instrument, a counteracting force is applied to the rotatable mirror to return it to its null position. This latter force is usually in the form of an electrostatic field which is controlled by a potentiometer. The potentiometer has a scale associated with it which indicates the amount of rotation required to produce a field of sufficient strength to return the reflected light beam to a null line on the translucent scale.

The prior art measuring instruments described briefly above, although generally satisfactory, tend to be relatively bulky, complex and expensive. Moreover, the prior art instruments are usually limited to a visual presentation of the measured values, and they do not provide appropriate electric signals which may be used for digital read-outs or for additional computations. Moreover, the latter type of prior art instrument, in which the rotatable mirror is returned to a null position, requires considerable adjustment to maintain the instrument in a calibrated condition.

The system and apparatus of the present invention, on the other hand, directly provides an electrical output which is representative of the measured value, and which can be used to activate an appropriate digital, or other type of display, or to provide input information to a digital computer.

The system of the invention, as will be described, has an advantage over the prior art instruments, in that it does not require manual adjustment or calibrations prior to or during each measurement. The system and apparatus of the invention also has the advantage of being relatively small and compact as compared with the aforesaid prior art instruments.

DETAILED DESCRIPTION OF THE ILLUSTRATED EMBODIMENT

Figure 1:
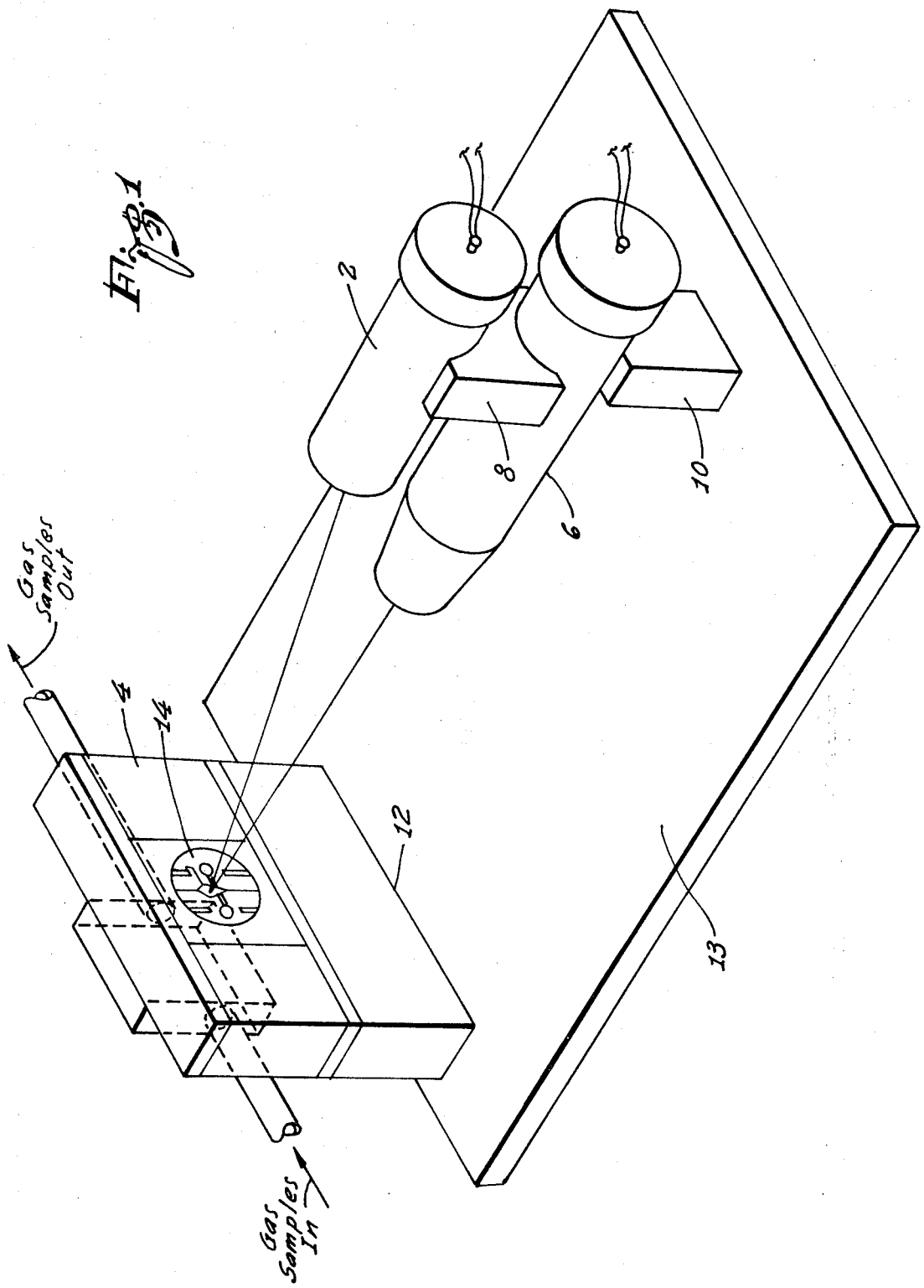
FIG. 1 is an isometric representation of apparatus constructed in accordance with the invention, and which for illustrative purposes, shows the system of the invention as applied to a particular gas analyzer which uses the paramagnetic properties of oxygen to determine the oxygen content in a gas sample.

The apparatus shown in FIG. 1 includes a light source 2 which, for example, may take the form of a cathode-ray tube flying-spot assembly. In the illustrated embodiment, the light from the source 2 is directed to a gas analyzer or oxygen cell 4. The apparatus also includes a photo-detector assembly 6 which may incorporate a usual photo-multiplier tube to produce an electric signal having an amplitude dependent upon the intensity of light reaching the assembly.

The light source 2 is mounted on the detector assembly 6 by means of a first mounting block 8. The detector assembly 6 and the gas analyzer cell 4 are mounted on a base plate 13 by means of respective mounting blocks 10 and 12. The mounting blocks 8, 10 and 12 assure that the light source 2 and gas analyzer 4 are held in proper relationship with respect to the detector assembly 6 for proper operation of the apparatus and system shown in FIG. 1.

For example, the gas analyzer cell 4 may be a conventional, commercially available unit in which the magnetic susceptibility of oxygen is used to determine the oxygen content in a gas sample, as the sample is passed through the cell. In such an analyzer cell, a small mirror 14 is suspended on a taut quartz fiber in a non-uniform magnetic field. When equilibrium is established, the magnetic force developed within the cell is balanced by the torsion of the quartz fiber. Then, when a gas sample with a different oxygen content is passed through the cell, the magnetic force is altered. This change in magnetic force is proportional to the partial pressure of oxygen in the sample, and the mirror 14 rotates with a degree of rotation which is proportional to the change in the magnetic force. In this way, the angular position of the mirror 14 is an indication of the oxygen content of the gas sample. After an appropriate calibrating procedure, any measured angular deflection of the mirror 14 from a reference position indicates the extent of change in oxygen content in the sample as compared with the reference standard.

The units 2 and 6 are positioned with respect to the rotatable mirror 14 of the gas analyzer cell 4 such that an optical path exists between the three units. The moving trace of light from the unit 2 is periodically initiated at a known point in time, and is directed to the rotatable mirror 14 to be reflected back to the photo-detector assembly 6. The assembly is such that the portion of the sweep trace of the light from the source 2 which is reflected to the photo-detector 6 depends upon the angular position of the mirror 14. As a result, the time delay between the initiation of the light trace in the source 2, and the receipt of the reflected portion of the trace by the photo-detector 6 is indicative of the angular position of the rotatable mirror 14 in the gas analyzer cell 4.

The mounting block 8 establishes and maintains the correct horizontal and vertical alignment between the source 2 and the photo-detector assembly 6; and the mounting blocks 10 and 12 provide proper alignment between these components and the gas analyzer cell 4, so as to provide the desired optical path from the source 2 to the mirror 14 and back to the photo-detector assembly 6.

Figure 2:
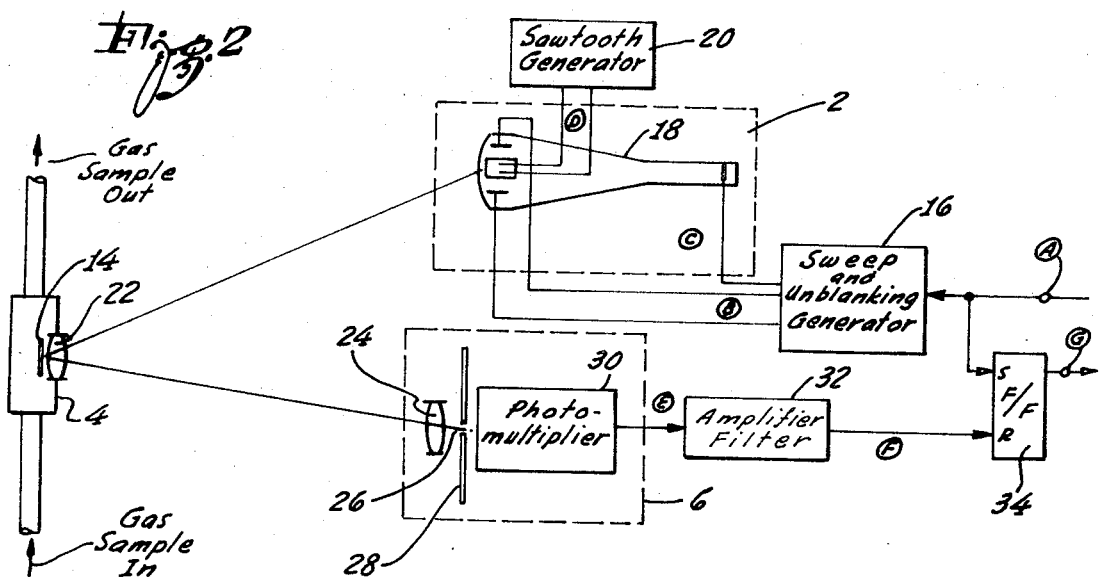
FIG. 2 is a schematic diagram, partly in block form, showing the components and system incorporated into the apparatus of FIG. 1.

Further details of the system of FIG. 1 are shown in the schematic representation of FIG. 2. As shown in FIG. 2, the source 2 includes a flying spot cathode-ray tube 18. The cathode-ray tube 18 includes a first pair of deflection plates which are activated by a sawtooth generator 20 so as to provide a cyclic scanning action of the light trace from the tube along a vertical axis. The cathode-ray tube 18 also includes a second pair of deflection plates which are activated by a sweep generator 16, and which provide a cyclic horizontal deflection for the resulting light trace. The sweep generator 16 also includes an unblanking circuit which applies an unblanking signal to a control electrode of the cathode-ray tube 18.

The gas analyzer 4 includes a lens system 22, and the photo-detector assembly 6 includes a corresponding lens 24. The lenses 22 and 24 are incorporated for focusing purposes. A plate 28 is included in the photo-detector assembly 6 having a pinhole 26 aligned with the lens 24, and a photo-multiplier 30 is positioned directly behind the pinhole. The output from the photo-multiplier 30 is amplified in an amplifier-filter stage 32.

Each horizontal sweep cycle is initiated by a clock pulse applied to the sweep generator 16 which triggers the sweep in the sweep generator 16, and which also causes the sweep generator to generate the unblanking pulse which is applied to the control grid of the cathode-ray tube 18. The clock pulse (A) is also applied to the set input terminal of a flip-flop 34 so as to set the flip-flop. The output of the amplifier-filter 32 is applied to the reset input terminal of the flip-flop 34. The flip-flop 34 produces an output pulse (G).

Figure 3:
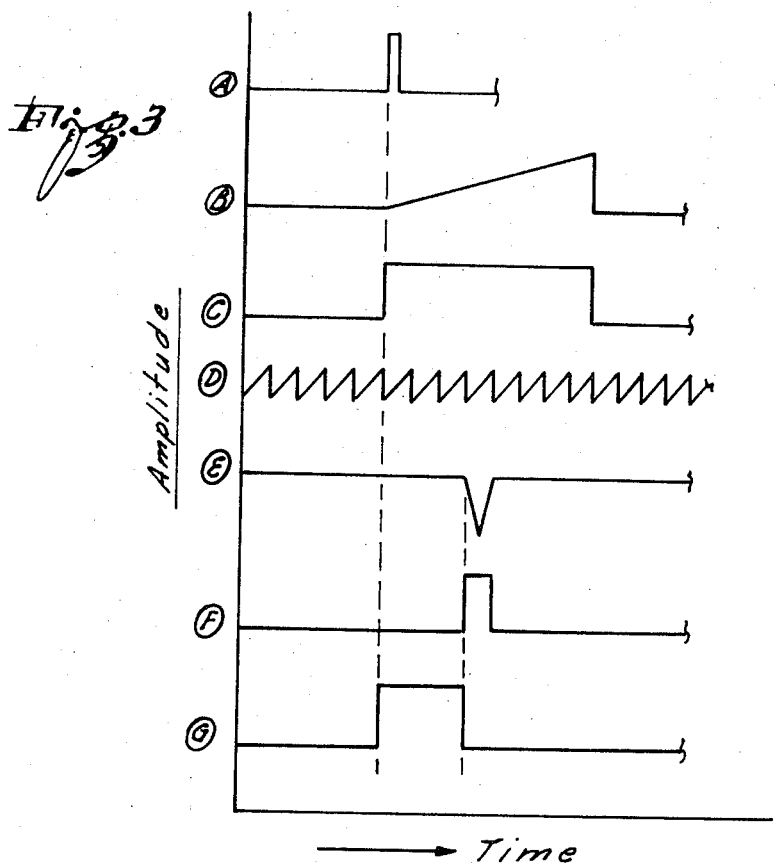
FIG. 3 is a series of curves useful in explaining the operation of the invention.

As explained briefly above, the angular position of the rotatable mirror 14 is determined by measuring the time delay between the initiation of the linear horizontal sweep of the cathode-ray tube 18 and the receipt of a reflected portion of the trace by the photo-multiplier 30. To achieve such a result, the clock pulse (A), as shown in FIG. 3, is applied to the sweep and unblanking generator 16 and to the flip-flop 34. This clock pulse may be periodically introduced to the circuit so that the circuit operates on a cyclic basis, continually monitoring the angular position of the mirror 14.

As shown in FIG. 3, upon the receipt of a clock pulse (A), the horizontal sweep (B) of the cathode-ray tube 18 is initiated, and the tube is unblanked by the initiation of the unblanking signal (C). The sawtooth generator 20 provides a cyclic vertical sweep (D) signal to the cathode-ray tube 18, so that the vertically deflected light trace has a measurable width.

The cyclic sweep signal (B) applied to the horizontal deflection plates of the cathode-ray tube 18 provides a precision horizontal sweep starting at the left of the screen of the cathode-ray tube and proceeding to the right across the face of the tube. The pulse (C), which has the same duration as the sweep signal (B), is applied to the unblanking grid of the cathode-ray tube 18 so that illumination of the cathode-ray tube will take place only during the sweep interval. The sawtooth generator 20 may be a conventional free running sawtooth generator which provides the cyclic vertical sweep signal (B) of FIG. 3, and the resulting cyclic vertical deflection of the trace allows for minor mechanical misalignment of the optical system, including the lenses 22 and 24.

With the system described above, a light trace is directed to the mirror 14 in the gas analyzer 4, and the reflected trace is focused on the pinhole 26 in the plate 28 by the lenses 22 and 24. Any light passing through the pinhole reaches the photo-multiplier 30 of the photo-detector assembly 6, and the photo-multiplier develops an electrical output signal having an amplitude corresponding to the intensity of the incident light.

It will be appreciated that only one spot of the reflected trace passes through the pinhole 26 to be incident upon the photo-multiplier, and the position of this spot with respect to the overall trace is dependent upon the angular position of the rotatable mirror 14. That is, the portion of the trace reflected through the pinhole is a function of the angular position of the mirror 14, and the system may be calibrated such that the initial point in the sweep will be reflected under reference conditions to provide an instantaneous output signal from the photo-multiplier 30. However, with the passage of a gas sample through the gas analyzer cell 4 having a different oxygen partial pressure from the established reference, the mirror 14 will rotate to a different angular position so that a different portion of the trace will be reflected through the pinhole 16 and onto the face of the multiplier 30.

Therefore, the photo-multiplier 30 produces a pulse output such as shown in the curve (E) of FIG. 3, with the position of the pulse with respect to the initiation of the trace of curve (B) being dependent upon the angular position of the mirror 14. This pulse is amplified and filtered in the block 32, so that the resulting electrical output has a form shown by the pulse (F) in the curve of FIG. 3. The leading edge of the pulse (F) resets the flip-flop 34, so that the output pulse (G) of FIGS. 2 and 3 has a width determined by the displacement of the pulse (E) from the reference position which, in turn, is a function of the angular position of the mirror 14. The amplifier-filter 32 may be of a conventional design, and is effective to amplify the signal (E) and to filter out or suppress any noise present in the input signal, so as to produce an essentially rectangular pulse (F), as shown in FIG. 3.

From the description set forth above, it can be seen that the time interval between the initiation of the horizontal sweep in the cathode-ray tube 18 caused by the introduction of each clock pulse (A), and the generation of the pulse (F) created by the receipt of the reflected trace at the photo-multiplier 30 is a measure of the angular position of the rotatable mirror 14. In the particular apparatus illustrated in FIGS. 1 and 2, this time interval is also directly related to the oxygen concentration in, or oxygen partial pressure of, the gas sample passed through the cell 4.

The flip-flop 34 may be of any conventional design in which a high output is initiated upon the receipt of a positive pulse at its set input terminal (F), and whose output will remain high until the flip-flop has been reset by receipt of a positive pulse at its reset input terminal (R). The output signal (G), whose width is a measure of the angular position of the mirror 14 can be used directly to drive an appropriate digital, or other display. Moreover, this signal may be fed into a digital computer, as mentioned above, for further processing.

It will be appreciated, of course, that while a particular embodiment of the invention has been shown and described, modifications may be made. It is intended in the following claims to cover all modifications which fall within the spirit and scope of the invention.

What is claimed is:

1. An electro-optical reflective angular position measuring system including: a measuring unit having a mirror therein rotatable about an axis and whose angular position with respect to said axis is an indication of a value being measured; a light source mounted with respect to said measuring unit so as to direct a beam of light towards said mirror and reflect said light beam therefrom, and including means for moving the light beam along a line lying essentially in a plane perpendicular to said axis producing a light beam trace discernible at the mirror; a photodetector assembly positioned to receive the light from said source as reflected by said mirror and for producing an electric output signal in response thereto; means interposed between said mirror and said photo-detector assembly for causing only a portion of the reflected trace to reach said photo-detector assembly; and means for comparing said electric output signal with said light beam trace to determine which portion of said reflected trace is being detected, said comparing means indicating the angular position of said mirror with respect to said axis.

2. The measuring system defined in claim 1, in which said last-named means includes a plate having a pinhole therein, and a lens system for focusing said portion of the reflected light into said pinhole.

3. The system defined in claim 1, in which said light source comprises a cathode-ray tube.

4. The system defined in claim 3, and which includes an electric circuit responsive to input clock pulses for causing the light periodically to be scanned along said line.

5. The system defined in claim 4, and which includes a bistable flip-flop circuit responsive to said input clock pulses to be set to a first state, and responsive to the output from said photo-detector to be set to a second state, said bistable flip-flop circuit producing an output pulse having a width proportional to the angular position of said mirror with respect to said axis.

* * * * *